(12) United States Patent
Skjaeveland

(10) Patent No.: US 6,186,245 B1
(45) Date of Patent: Feb. 13, 2001

(54) ASSEMBLY OF REPLACEABLE WEAR PARTS ON A PLOUGH BODY

(75) Inventor: Magne Skjaeveland, Kvernaland (NO)

(73) Assignee: Kverneland Klepps AS, Kvernaland (NO)

(*) Notice: Under 35 U.S.C. 154(b), the term of this patent shall be extended for 0 days.

(21) Appl. No.: 09/367,323

(22) PCT Filed: Feb. 4, 1998

(86) PCT No.: PCT/GB98/00225

§ 371 Date: Oct. 19, 1999

§ 102(e) Date: Oct. 19, 1999

(87) PCT Pub. No.: WO98/35545

PCT Pub. Date: Aug. 20, 1998

(30) Foreign Application Priority Data

Feb. 14, 1997 (GB) .................................................. 9703116

(51) Int. Cl.$^7$ .................................................. A01B 15/06
(52) U.S. Cl. .......................................................... 172/772
(58) Field of Search .............................. 172/772, 772.5, 172/762, 681, 701.3, 702–704, 719, 735–737, 749, 750, 753

(56) References Cited

U.S. PATENT DOCUMENTS 1,992,791    2/1935    Wannemacher .

FOREIGN PATENT DOCUMENTS

| 5 529 | 7/1878 | (DE) . |
| 26 079 | 7/1923 | (FR) . |
| 2 036 688 | 12/1970 | (FR) . |
| 2 350 775 | 12/1977 | (FR) . |
| 107 738 | 8/1917 | (GB) . |
| 2 100 562 | 1/1983 | (GB) . |
| 2 183 434 | 6/1987 | (GB) . |

*Primary Examiner*—Christopher J. Novosad
(74) *Attorney, Agent, or Firm*—Workman, Nydegger & Seeley

(57) ABSTRACT

A combination of a soil-working part and a mounting part to be provided on a plough body. The working part has a pair of opposed working tips and is configured to be mounted on the mounting part so that one of the tips is an outboard tip. The outboard tip projects from the mounting part so as to be capable of carrying out a soil-working operation in use of the plough body. The other of the tips is an inboard tip in which the working part has first and second modes of adjustment relative to the mounting part when tip wear occurs.

9 Claims, 4 Drawing Sheets

ASSEMBLY OF REPLACEABLE WEAR PARTS ON A PLOUGH BODY

BACKGROUND OF THE INVENTION

This invention relates to an assembly of replaceable wear parts on a plough body, and is particularly, though not exclusively, concerned with an improved means of mounting reversible plough points on a ploughshare of a plough body and or share knives on a landside of a plough body.

2. Present State of the Art

It is known to provide reversible plough points or tines on ploughshares, and when one working tip of the point becomes excessively worn, the point is demounted from a mounting part, rotated through 180° so as to bring the previously unworn tip to a working position, and then reassembled. Usually, two separate fasteners are used to mount the point on the mounting part, so as to provide suitably strong clamping force to clamp the parts together, and to resist shear loads generated in service, but also to provide necessary resistance to any tendency for the point to rotate, which would arise in the event of use of a single fastener.

OBJECTS AND BRIEF SUMMARY OF THE INVENTION

The formal definition of the invention is set out in the appended set of claims. A major objective of the invention is to provide a new and improved combination of a soil-working projecting part and mounting part, to be provided on a plough body, in which the soil-working part is intended to project beyond the mounting part so as to be capable of carrying out a soil-working operation in use of the plough body, and in which two different types of adjustment can be achieved when working tip wear occurs.

BRIEF DESCRIPTION OF THE DRAWINGS

Preferred embodiments of the invention will now be described in detail, by way of example only, with reference to the accompanying drawings, in which.

DETAILED DESCRIPTION OF THE PREFERRED EMBODIMENT

Figure 1:
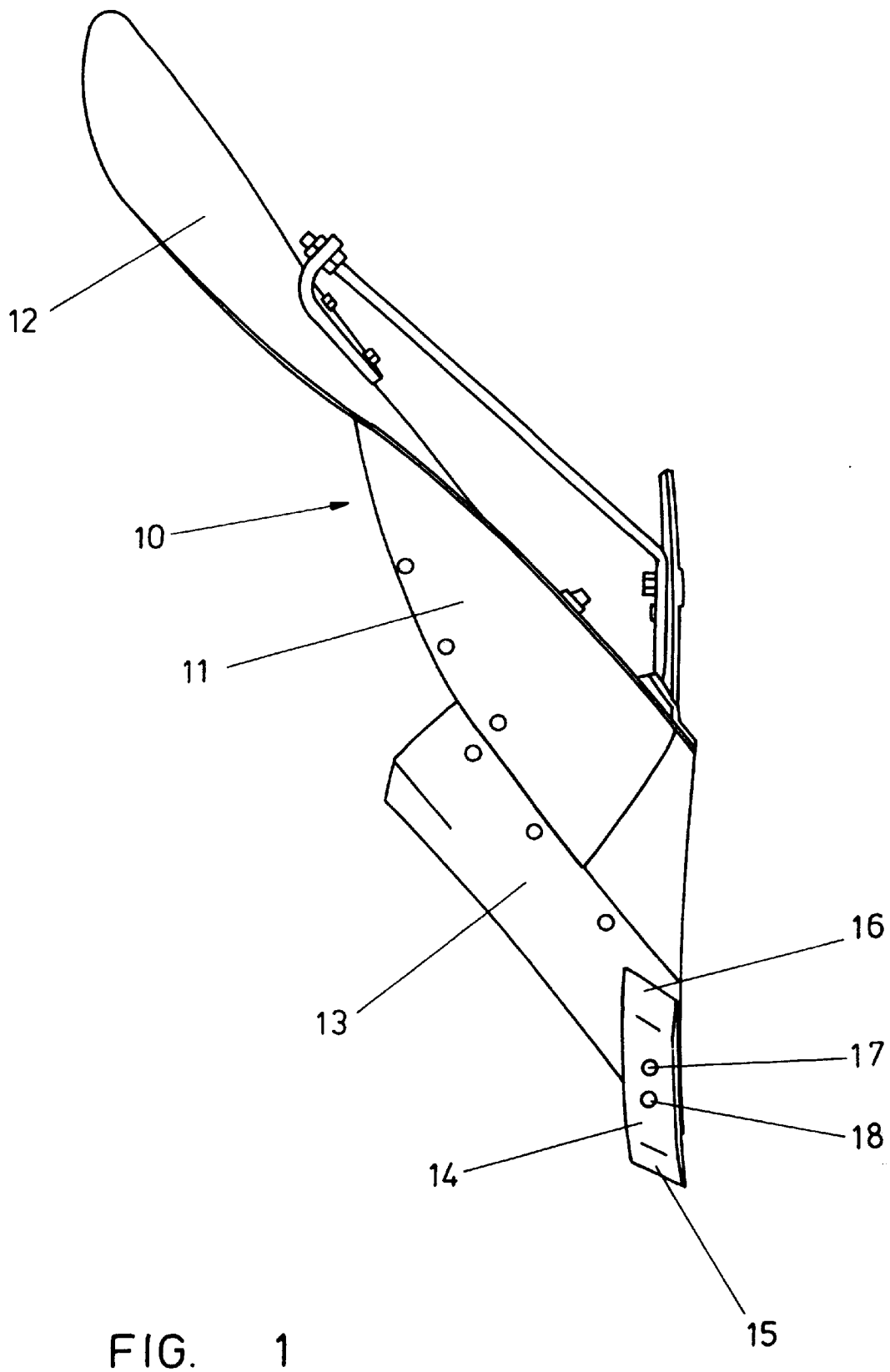
FIG. 1 is a plan view of d plough body having a known mounting arrangement of reversible tine or point mounted on a ploughshare of the plough body.

Referring first to FIG. 1, a typical plough body is shown in plan view, and designated generally by reference 10, and comprising standard components making-up a plough body, as will be well known to those of ordinary skill in the art, and including mouldboard 11, mouldboard wing 12, ploughshare 13 and replaceable tine or plough point 14, mounted on the forward end of ploughshare 13. The plough point 14 has a pair of opposed working tips 15 and 16, of which tip 15 is the outboard tip presently being used as the working tip, to carry out working of the soil during forward movement of the plough 10, whereas tip 16 is located inboard, and is ready for use, by reversal of the tips, when excessive wear of the outboard tip 15 occurs, Reversal of the tips is achieved by demounting the point 14 from a mounting part (not shown in detail) provided on the leading end of the ploughshare 13, and then rotating the point 14 through 180°. The securement of the point 14 to the mounting part is normally achieved by use of two separate fasteners, shown by references 17 and 18 in FIG. 1. Two fasteners are required, both to securely clamp the point 14 to the mounting part, and to resist shear forces generated during forward movement, and also to resist any tendency for the point 14 to rotate about its mounting. Evidently, when tip reversal is required, in the event of excessive wear, it is necessary to unfasten both of the fasteners 17 and 18, remove the point 14, rotate it through 180°, and then represent to the mounting part, and then reassemble the fasteners. The fasteners are liable to become difficult to unfasten, by reason of rusting or corrosion, and therefore tip reversal is a time consuming task. Bearing in mind that a typical plough frame will have a considerable number of plough bodies, and especially in the case of reversible ploughs, plough point reversal is quite a time consuming task.

Also, the type of wear to which the tips of the point 14 are subjected vary with the type of soil which is being ploughed. If the soil conditions are very hard, it is necessary to work the soil with a plough point which has a sharp leading edge, so as to guide the plough body down into such hard ground. When the leading edge becomes unduly worn, it is then necessary to reverse the plough point, so that the previously inboard and unworn tip now becomes the outboard working tip. However, in less arduous soil or ground conditions, while wear of the plough point tip does occur, it is less arduous, and the plough point tip therefore has a potentially longer working life than when working in hard conditions. Thus, a partly worn tip is still capable of carrying out a reasonable working operation. However, even in less arduous soil conditions, wear of the plough point tip occurs, and over a period of time this reduces the extent by which the plough point tip projects forwardly from the mounting part of the ploughshare 13 on which the plough point 14 is mounted, and this reduces the effectiveness of the plough point tip.

With the known arrangement of mounting of the plough point 14, it then becomes necessary to disassemble the mounting of the plough point 14, and remount it with the inboard tip now the outboard forwardly projecting tip, but this represents an under-use of the worn tip, and which is only rendered unusable because it is worn back too close to the mounting part i.e. it does not project from it by a sufficient extent to carry out a satisfactory engagement with the ground. If means could be provided to advance the worn tip i.e. to increase the extent by which it projects beyond the mounting part, then further useful life of the plough point could be achieved in less arduous conditions.

The preferred embodiments of the invention which will be described seek to provide, in a simple assembly, two separate modes of adjustment, in a first of which there can be achieved reversal of the tips when the outboard tip becomes worn and then becomes the inboard tip, and which is replaced by the inboard tip which now becomes the outboard tip. In the second mode of adjustment, a partly worn outboard tip can be moved in a direction outwardly of the mounting part to compensate for tip wear, and without need for tip reversal.

Figure 2:
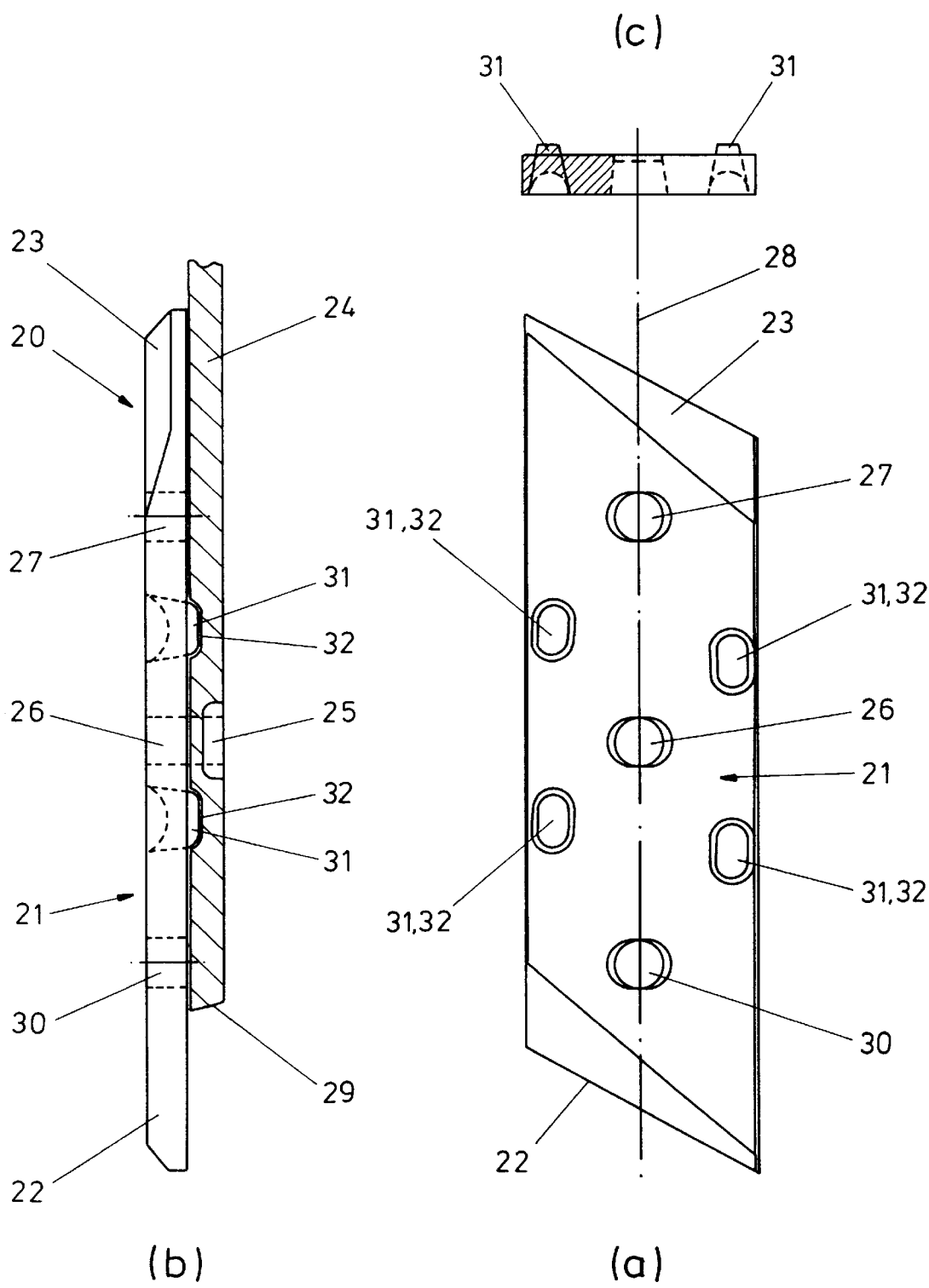
FIGS. 2a to 2c are, respectively, plan view, side view, and sectional view, of a first embodiment of a combination according to the invention comprising a soil-working part and a mounting part to be provided on a plough body, and taking the form of a reversibly mounted tine or plough point.
Figure 3:
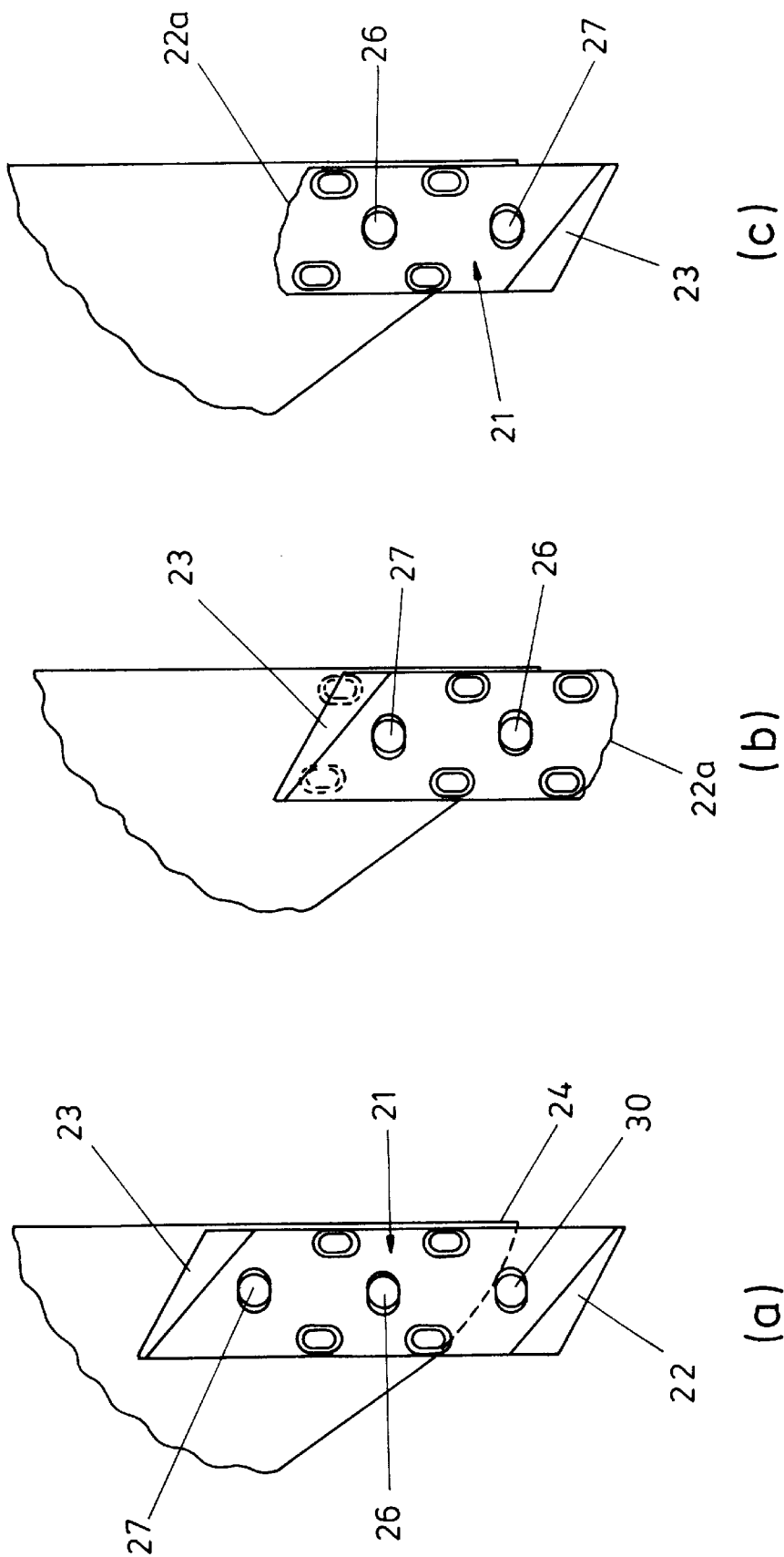
FIGS. 3a, b and c are illustrations of different modes of adjustment of the mounting position of the point relative to the mounting part.

FIGS. 2 and 3 of the drawings show one preferred embodiment of the invention, comprising a combination of a soil-working part and a mounting part, in which the soil-working part comprises a tine or plough point. However, the invention may also be applied to other types of soil-working part, to be provided on a plough body, and including a so-called share knife.

A typical known arrangement of share knife will now be described with reference to FIG. 4a, and which shows, in addition to plough point 14, a share knife 19 which is mounted on the forward end of the ploughshare 13 as part of a combined assembly with the plough point 14. Thus, the same fasteners e.g. threaded bolts are used to clamp both the share knife 19, and also the plough point 14 to same mounting point on the ploughshare. This is disadvantageous, since it is usual for the plough point 14 to wear out more quickly than the share knife, but both have to be unclamped and removed, when the plough point becomes unduly worn.

In a further preferred embodiment of the invention (shown in FIG. 4b), this is applied to a soil-working part in the form of a share knife (described later), and utilising generally the same coupling features which are applied to the embodiment of plough point according to the invention, which will now be described with reference to FIGS. 2 and 3.

Referring now to FIGS. 2 and 3, a combination of soil-working part and mounting part according to the invention is designated generally by reference 20 and comprises a reversible plough point 21 having opposed point tips 22 and 23 which have sharpened leading edges in order to cut into the ground when mounted on a ploughshare. In the illustrated arrangement, the tip 22 is the outboard and working tip, whereas the tip 23 is the inboard tip, ready for future use when tip 22 becomes worn.

The plough point 21 is reversibly mounted on mounting part 24 which, in turn, will be suitably mounted on a leading edge of the ploughshare (13 in FIG. 1). A single fastener (not shown) e.g. a screw threaded bolt with a conical head and a nut, is used to clamp the point 21 to the mounting part 24, when the fastener is tightened, but when the fastener is partly released, it defines a pivot axis which allows rotation of the point 21 so as to reverse the tips 22 and 23 when the first mode of adjustment is required following excessive wear of the tip 22.

A single mounting hole for the fastener is formed in one of the parts 21, 24, and in the illustrated arrangement the single mounting hole 25 is formed in the mounting part 24. First and second mounting holes 26 and 27 are formed in the other of the parts i.e. in the point 21 in the illustrated embodiment, and as can be seen from FIG. 2, mounting holes 26 and 27 are axially spaced from each other with respect to the longitudinal axis 28 of the point 21 which extends between the opposed tips 22 and 23.

When a new point 21 is installed, the fastener will be received by the single mounting hole 25 in the mounting part 24, and will initially be mounted in the first mounting hole 26 in the point 21 Then, when tip reversal is required, adjustment of the fastener to a partly released position allows relative separation between the point 21 and the mounting part 24 (and disengagement of co-operating pegs and recesses which will be described in more detail below), so that 180° rotation of the point 21 can take place, about the axis of the fastener, and which also coincides with the axis of the single mounting hole 25 in the mounting part 24, so that the first mode of adjustment can take place.

Reversal of the tips may be necessary when working in arduous or hard soil conditions, but in less arduous conditions, in which it is not absolutely essential to have a completely sharp leading edge of the point tip at all times, it may be satisfactory to continue working with a partly worn edge of the working tip. However, with progressive wear even under less arduous conditions, evidently the tip wears so as to reduce the extent by which it projects beyond the leading edge 29 of the mounting part 24. In such event, the second mode of adjustment may then be used, whereby the fastener is removed from the aligned single mounting hole 25 in part 24, and first mounting hole 26 in point 21, followed by forward projection of the point 21 so as to bring the second mounting hole 27 into register with the single mounting hole 25, and completed by remounting of the fastener and tightening.

FIGS. 3a, b and c show these first and second modes of adjustment FIG. 3a shows the initial assembly position of a newly installed point 21, in which the fastener extends through the first mounting hole 26. FIG. 3b shows forward adjustment of the point 21, so that the fastener then extends through single mounting hole 25 in the mounting part 24 and through the second mounting hole 27. The worn profile of the working tip 22 is shown in FIG. 3b by reference 22a.

FIG. 3c shows reversal of the point 21, in the first mode of adjustment, whereby the fastener remains located in the first mounting hole 26, but in which the previously inboard unworn tip 23 is now located outboard, and the worn tip, with its profile 22a is now rotated through 180° to the inboard position.

The provision of the first and second mounting holes 26 and 27 (preferably provided in the point 21) is a minimum requirement, although in practice it will be preferable to include a third mounting hole 30, so that a symmetrical arrangement is provided, whereby either tip 22 or 23 can be installed initially as the inboard and non-working tip.

In the arrangement illustrated in FIGS. 2 and 3, it will be evident that the mounting hole 30 i.e. that associated with the initially installed and unworn working tip 22, serves no mechanical function, and indeed becomes worn away with the wearing of the working tip 22 to take-up the worn profile 22a.

There was described briefly above the provision of additional means to clamp the point 21 to the mounting part 24, when the fastener is tightened, and this comprises a co-operating set of four pegs and corresponding recesses, provided on the point 21 and part 24. The co-operation between the pegs and recesses couples the parts 21 and 24 together against rotation about the axis of the fastener when the parts are clamped together. In the illustrated arrangement, the set of four pegs is provided on the point 21, and as shown by reference 31, whereas the corresponding four recesses are provided in the mounting part 24, and as shown by reference 32.

Each of the four pegs 31 is received by a respective one of the recesses 32 in each of the positions of tip reversal which can be taken-up by the first mode of adjustment i.e. in either of positions shown in FIGS. 3a or 3c. Obviously, the geometry of the arrangements of the pegs and recesses must be such as to allow interfitting between the pegs and recesses to take place, in either position of adjustment through 180° about the axis of the fastener.

However, when the second mode of adjustment takes place, as shown in FIG. 3b, only two of trip four pegs 31 are received by respective recesses 32, and with the remaining two pegs now being located in the forwardly projected position beyond the leading edge 29 of the mounting part 24. However, even in the position of FIG. 3b, the two pegs which interfit in the respective recesses provide significant resistance to rotation of the point 21 about the axis of the fastener, and thereby minimise the shear loads applied to the fastener in service.

Figure 4A:
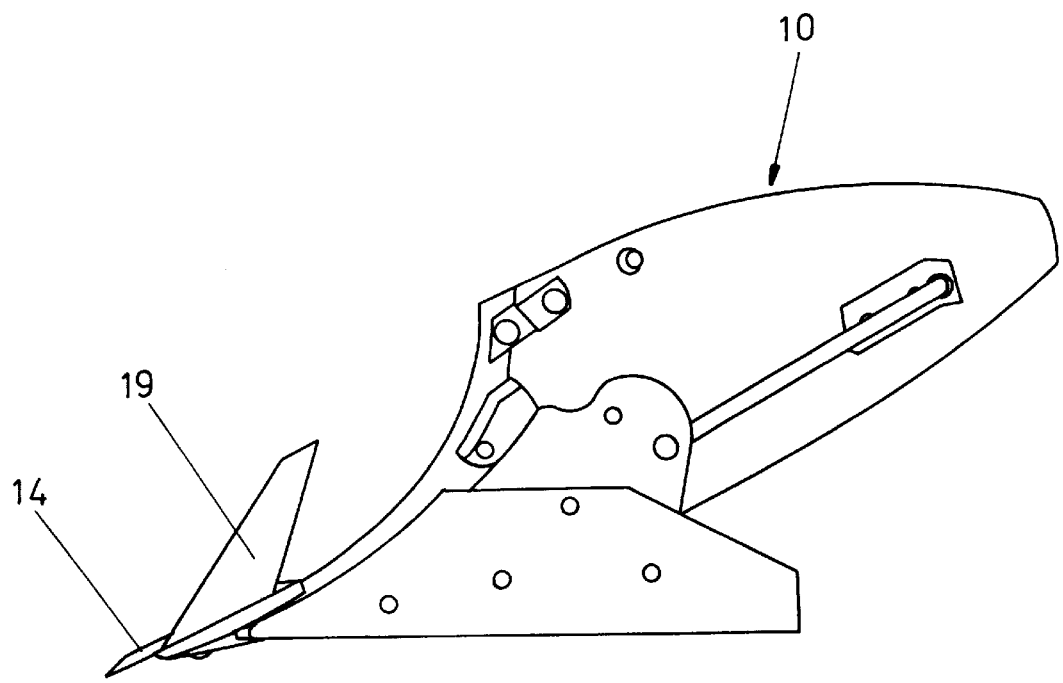
FIG. 4a is a side view of a known arrangement of combined mounting of a plough point and a share knife on the ploughshare.
Figure 4B:
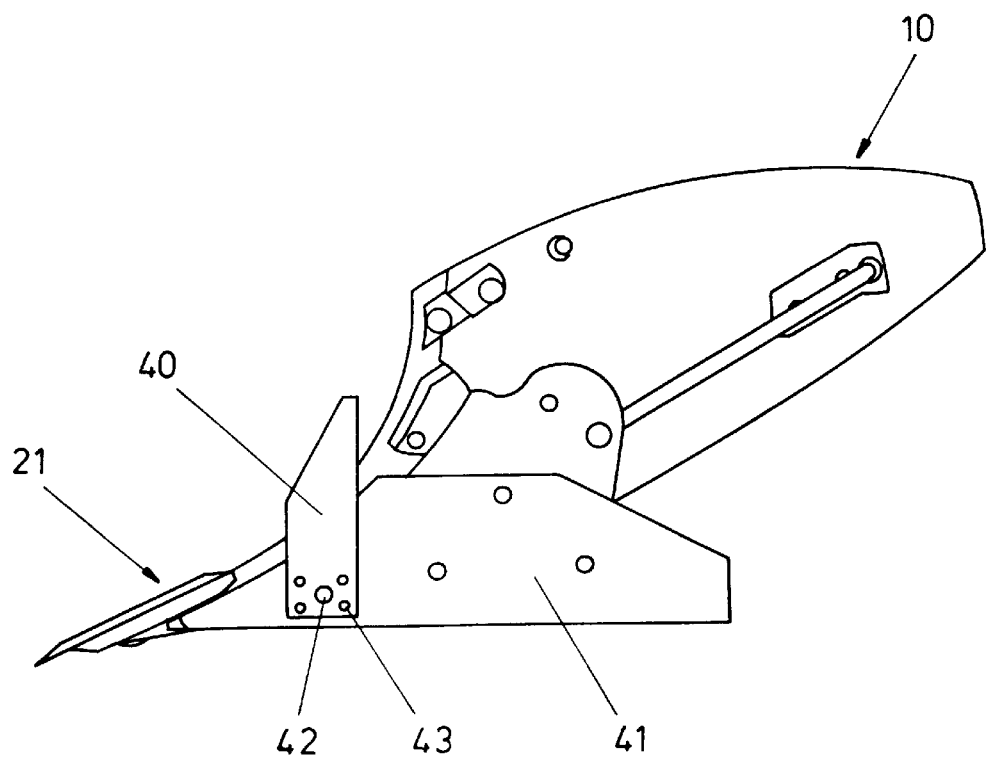
FIG. 4b is a side view, similar to FIG. 4a, of a further embodiment of the invention.

As mentioned above, the means of clamping, and adjusting the plough point 21 to the mounting part 24 may also be utilised in the separate assembly of a share knife to a suitable mounting position on a plough body (compare with known means of assembly of share knife 19 shown in FIG. 4a). This is a new means of mounting a share knife, and which can be mounted in a single fixing hole and using four pegs as shown in FIG. 4b (described in more detail below). In practice, the share knife can be fastened in the foremost hole provided in the landside of the plough, although it will be necessary to form recesses around this hole to match the pegs formed in the share knife. The fastening process and the clamping can then be the same as described above for the point. The share knife can therefore be replaced independently of the adjustment of the points, and the share knife adjustment also requires removal of one screw or bolt. This means that the share knife can be positioned to a position more rearwardly than in known arrangements, and this can be advantageous, because there will then be a greater distance between the share knife and the disc coulter blades in the circumstances where disc coulters are used.

Referring now in detail to the illustration of the preferred embodiment shown in FIG. 4b, a reversible plough point 21 is mounted on plough body 10 in generally similar manner to that described above with reference to FIGS. 2 and 3, and a replaceable share knife 40 is mounted on the landside 41 of the plough body 10. Share knife 40 is mounted by a single fastener 42, eg a bolt or screw, and a cooperating array of (four) surrounding pegs/recesses shown by reference 43.

The soil-working parts (plough points and/or share knives) to which the invention is applied will usually be manufactured by hot forging to tile desired shape. Simultaneously, necessary fixing holes are punched, and in addition a number of pegs are formed in one of the parts and corresponding number of recesses on the other parts are forged.

The new fastening method of assembly will be particularly suitable for use in mounting reversible points on a ploughshare, and the fastening of a share knife to a landside.

It should be understood that the number of pegs/recesses used to mount the replaceable share knife (40) is not critical and may be four as shown in FIG. 4b, or could be other numbers, such as two, three, or five.

With regard to the mounting of the plough point, an arrangement of four pegs/recesses is preferred, but other symmetrical arrangements may be used, provided that they permit (a) rotation through 180° to reverse the point tips and (b) lengthwise adjustment between the first and second modes of adjustment. By way of example, two, four or six pegs/recesses may form different sets which can be used.

What is claimed is:

1. A combination of a soil-working part and a mounting part to be provided on a plough body, said working part having a pair of opposed working tips and being intended to be mounted on said mounting part so that one of said tips is an outboard tip which projects from the mounting part so as to be capable of carrying out a soil-working operation in use of the plough body, and the other of said tips is an inboard tip, in which:

(a) the working part has first and second modes of adjustment relative to the mounting part when tip wear occurs;

(b) the first mode of adjustment can be carried out when reversal of the tips is required whereby the worn outboard tip becomes the inboard tip, and the inboard tip becomes the outboard tip;

(c) the second mode of adjustment can be carried out when a worn outboard tip is required to be moved in a direction outwardly of the mounting part to compensate for tip wear;

(d) a single fastener is operative to connect the working part to the mounting part, said fastener when tightened clamping the parts together and when partly released defining a pivot axis which allows rotation of the working part so as to reverse the tips, when the first mode of adjustment is required;

(e) a single mounting hole is formed in a first of said parts, and first and second mounting holes are formed in a second of said parts and which are axially spaced from each other with respect to the longitudinal axis of the working part which extends between the opposed tips; in which the fastener is receivable by said single mounting hole and is initially mountable in the first of said mounting holes when the working part is installed, and is mountable in the second of said mounting holes when tip wear requires increased projection of the outboard tip when the second mode of adjustment is carried out; and, (f) a set of four pegs and a set of co-operating recesses are provided on said parts and which are able to co-operate in order to couple the parts together against rotation about the axis of the fastener when the parts are clamped together, the arrangement being such that (i) each of the four pegs is receivable by a respective recess in each position of tip reversal which can be taken-up by the first mode of adjustment, and (ii) two of the pegs can be received each by a respective recess when the second mode of adjustment is carried out, in which the fastener is moved from the first mounting hole to the second mounting hole in order to increase the projection of a worn tip from the leading edge of the mounting part.

2. A combination according to claim 1, in which a third mounting hole is provided spaced axially in an opposite direction from the first mounting hole than the second mounting hole, and by the same distance, so as to provide a symmetrical arrangement.

3. A combination according to claim 1, in which the single mounting hole is provided in the mounting part, and the other mounting holes are provided in the soil-working part.

4. A combination according to claim 1, in which the soil-working part comprises a plough point or tine.

5. A combination according to claim 1, in which the soil-working part comprises a share knife.

6. A plough body having a pair of combinations mounted thereon, each combination comprising a soil-working part and a mounting part, said working part having a pair of opposed working tips and being intended to be mounted on said mounting part so that one of said tips is an outboard tip which projects from the mounting part so as to be capable of carrying out a soil-working operation in use of the plough body, and the other of said tips is an inboard tip, in which:

(a) the working part has first and second modes of adjustment relative to the mounting part when tip wear occurs;

(b) the first mode of adjustment can be carried out when reversal of the tips is required whereby the worn outboard tip becomes the inboard tip, and the inboard tip becomes the outboard tip;

(c) the second mode of adjustment can be carried out when a worn outboard tip is required to be moved in a direction outwardly of the mounting part to compensate for tip wear;

(d) a single fastener is operative to connect the working part to the mounting part, said fastener when tightened clamping the parts together and when partly released defining a pivot axis which allows rotation of the working part so as to reverse the tips, when the first mode of adjustment is required;

(e) a single mounting hole is formed in a first of said parts, and first and second mounting holes are formed in a second of said parts and which are axially spaced from each other with respect to the longitudinal axis of the working part which extends between the opposed tips; in which the fastener is receivable by said single mounting hole and is initially mountable in the first of said mounting holes when the working part is installed, and is mountable in the second of said mounting holes when tip wear requires increased projection of the outboard tip when the second mode of adjustment is carried out; and, (f) a set of four pegs and a set of co-operating recesses are provided on said parts and which are able to co-operate in order to couple the parts together against rotation about the axis of the fastener when the parts are clamped together, the arrangement being such that (i) each of the four pegs is receivable by a respective recess in each position of tip reversal which can be taken-up by the first mode of adjustment, and (ii) two of the pegs can be received each by a respective recess when the second mode of adjustment is carried out, in which the fastener is moved from the first mounting hole to the second mounting hole in order to increase the projection of a worn tip from the leading edge of the mounting part;

the soil-working part of one of said combinations having the form of a plough point, and the soil-working part of the other combination having the form of a share knife, each combination being mounted on a separate part of the plough body.

7. A plough body according to claim 6, in which the plough point is mounted on a ploughshare of the plough body and the share knife is mounted on the landside of the plough body.

8. A plough body according to claim 7, in which the plough point is mounted on the plough share via cooperating sets of one, two, or more pairs of cooperating pegs and recesses.

9. A plough body according to claim 7, in which the share knife is mounted on the landside of the plough body via a single fastener, and two or more cooperating pegs/recesses.

* * * * *